United States Patent Office 3,363,501
Patented Jan. 16, 1968

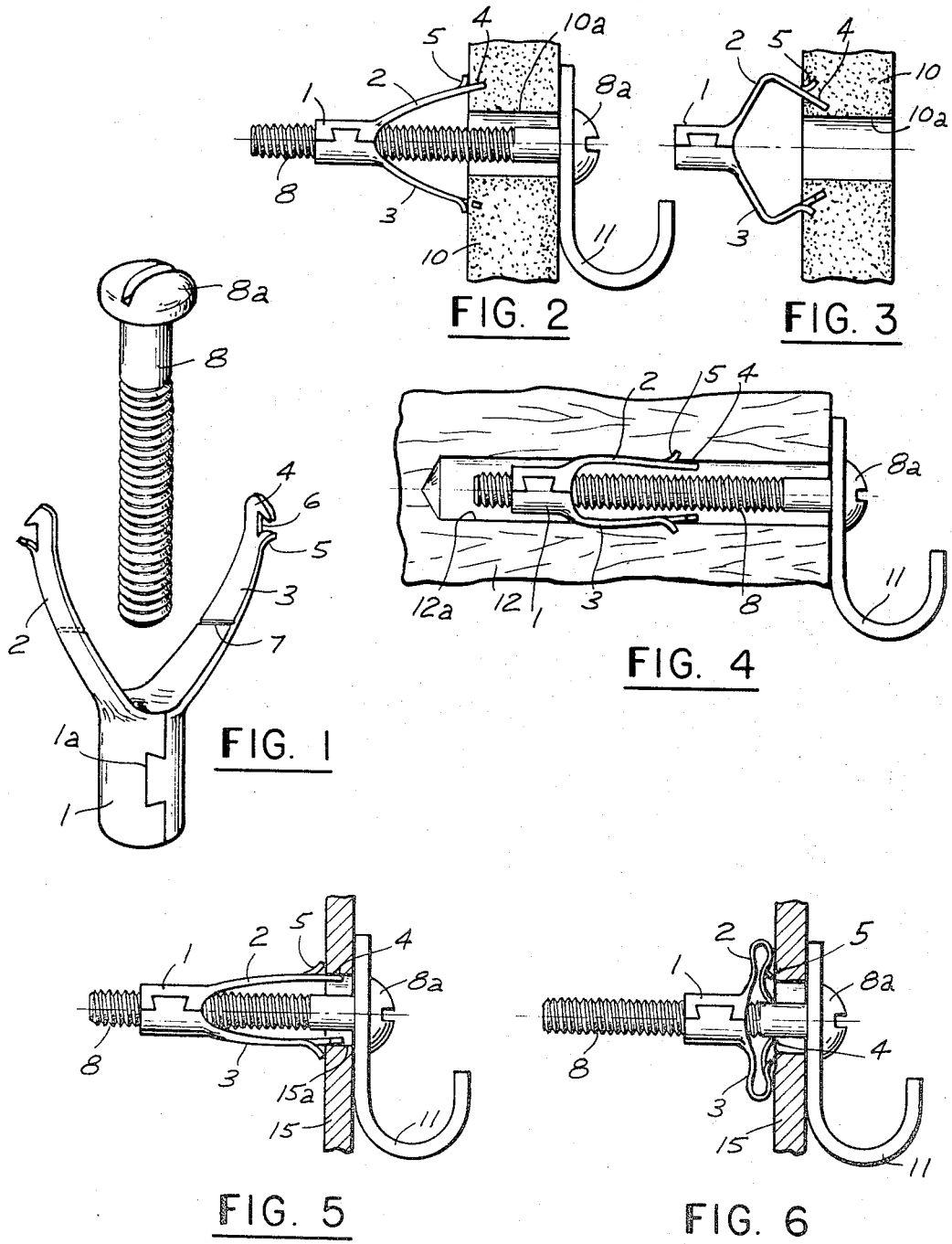

3,363,501
WALL ANCHOR
Henry J. Modrey, Eagle Drive, Stamford, Conn. 06903
Filed Apr. 6, 1966, Ser. No. 540,768
5 Claims. (Cl. 85—71)

ABSTRACT OF THE DISCLOSURE

A wall anchor for anchoring in a mounting hole of a support member and including an anchor member which is engageable with the support member and deformable by tightening of a screw member. The wall anchor can be used for many different domestic and industrial fastening requirements and is also capable of functioning as a hollow wall anchor for anchoring in a wall behind which space is available but not accessible; as an expansion bolt for anchoring in a wall having a blind mounting hole, and as a blind nut for attaching screws to thin panels from the front side thereof.

---

The present invention relates to a wall anchor for anchoring in a mounting hole in a support member, and more particularly to a wall anchor having an anchor member engageable with the support member and deformable by tightening of a screw member. Wall anchors of this type are widely used for securing two objects to each other, for instance, for securing a bracket, a panel or a hook to a support member, such as a wall.

It is a broad object of the invention to provide a novel and improved wall anchor of the general kind above referred to which has a high versatility of use and yet is very simple in construction. As a result, a single type of wall anchor can be used for many different domestic and industrial fastening requirements which heretofore required different types of wall anchors.

A more specific object of the invention is to provide a novel and improved wall anchor of the general kind above referred to which is capable of functioning as a hollow wall anchor for anchoring in a wall or other support behind which space is available but not accessible; as an expansion bolt for anchoring in a wall or other support having a blind mounting hole, that is, a mounting hole which does not extend through the thickness of the support; and as a blind nut for attaching screws to thin panels from the front side thereof.

Other and further objects, features and advantages of the invention will be pointed out hereinafter and set forth in the appended claims constituting part of the application.

In the accompanying drawing a preferred embodiment of the invention is shown by way of illustration, and not by way of limitation.

In the drawing:

FIG. 1 is a perspective exploded view of a wall anchor according to the invention;

FIG. 2 is a view of the anchor mounted as a hollow wall anchor;

FIG. 3 shows the anchor member of the anchor in a more strongly tightened condition, the screw of the anchor being removed;

FIG. 4 is a view of the anchor mounted as an expansion bolt;

FIG. 5 is a view of the anchor mounted as a blind nut; and

FIG. 6 is a view similar to FIG. 5, showing the anchor more strongly tightened.

Referring first to FIG. 1 in detail, the wall anchor exemplified in this figure comprises a hollow internally threaded shank or nut 1. The shank is preferably formed of springy sheet metal the ends of which are suitably joined together, for instance, by dovetailing, as is indicated at 1a. One or several fingers or arms extend from one peripheral edge of shank 1, preferably integral therewith. There are shown two diametrically opposite symmetrically disposed legs or arms 2 and 3 which are outwardly bent to define an acute angle with the center axis of the shank. Each arm is formed of a flat strip one side of which faces the center axis of the shank. Each arm has at its tip a laterally extending hook or spike 4 and a second hook 5 separated from the first hook by a notch 6 cut out of the material of the arm. The upper hook terminates in a point 4 and is generally in the plane of the arm. The lower hook 5 is bent outwardly out of the plane of the arm and terminates in a point or an edge. It is preferably formed directly out of the material of the arm. Each of the arms is provided with a score line 7 approximately midway between the tip and the base of the arm to facilitate bending thereof, for a purpose which will be more fully described hereinafter.

The wall anchor further comprises a screw 8 having at one end a suitably shaped head 8a. The threads of the screw fit the internal threads of shank 1.

Turning now to FIG. 2, this figure shows the wall anchor mounted as a hollow wall anchor on a wall 10, which should be visualized as a wall made of a comparatively soft material, such as plasterboard, and including a mounting hole 10a. The mounting hole may be produced by any suitable piercing tool, such as a drill. The mounting of the anchor is to be effected from the right side of the wall, and space is assumed to be available, but not accessible, on the left side of the wall. The diameter of the mounting hole is not critical. It must, of course, permit passage of shank 1 of the anchor, but there need not be a close fit between the diameter of the hole and the diameter of the shank. In fact, the shank is shown as having a considerably smaller diameter than that of the mounting hole.

To fasten the anchor to the wall, bolt 8 is pushed through a hole in the object which is to be fastened by the anchor, such as a hook 11, and the screw is then threaded into the shank. The entire assembly is now pushed through the mounting hole so that arms 2 and 3 are clear of the left surface of the wall. The springiness of arms 2 and 3 permits a ready passage thereof through the hole, and after having passed the hole, they will snap back into their original positions. The screw is now pulled back so that hooks 4 bite slightly into the material of the wall.

The shank assembly is now sufficiently anchored in the wall to permit rotation of the screw in the shank. Toward the end of the screw's travel, the arms 2 and 3 are pulled back so that the bent hooks 5 abut against the surface of the wall, as shown in FIG. 2. If turning of the screw is continued beyond the position shown in FIG. 2, the arms will be outwardly bent by yielding at the score lines 7, and hooks 4 may also be forced into the material of the wall, as is shown in FIG. 3.

Such overtightening of the screw does not in any way reduce the holding strength of the anchor. Its principal purpose is to effect attachment of the shank assembly to the wallboard in the position of FIG. 3 so that bolt 8 may be temporarily removed, as shown in FIG. 3, for instance, to exchange the hook 11 for another fixture to be supported by the wall anchor.

Turning now to FIG. 4, this figure shows mounting of the wall anchor in a blind hole 12a formed in a wall 12, such as a wooden or masonry wall.

The wall anchor, assembled as previously described, is pushed into hole 12a, the diameter of which need not be a close fit with the diameter of shank 1. The outwardly bent hooks 5 will bite into the wall material, due to the inherent springiness of arms 2 and 3, thereby providing sufficient starting friction for turning screw bolt 8 in shank 1. As the tightening of the screw bolt is continued, shank 1 will be pulled slightly outwardly in the hole, since hooks 5 provide stationary abutment points in the hole. As a result, the portions of the arms between the base thereof and hooks 5 will spread outwardly into pressure engagement with the surrounding wall material, thereby correspondingly increasing the anchoring force with which the anchor is retained in the mounting hole.

As is now evident, a wall anchor according to the invention, when mounted in a blind hole, functions in the manner of an expansion bolt.

FIGS. 5 and 6 show mounting of the wall anchor in a thin panel 15 made from comparatively hard material, such as plastic or metal, which the hooks 4 and 5 are unable to penetrate. The anchor is assembled as previously described, and is pushed through a mounting hole 15a in the panel to a depth such that the outwardly bent hooks 5 are outside the hole but hooks 4 are still within the hole, as shown in FIG. 5. The inherent outward bias of arms 2 and 3 presses the hook portions 4 against the hole wall with sufficient friction to permit tightening of screw bolt 8. If the tightening of the bolt is continued, the arms will collapse outwardly along score lines 7, as shown in FIG. 6. The tips of the arms will pivot in the corner formed by hooks 4 and 5, through the pressure of the hole edge, as shown in FIG. 6. As is now evident, the wall anchor according to the invention constitutes in effect a very simple blind nut which can be assembled from one side of the panel. Moreover, hooks 4, when forced into the position of FIG. 6 by continued tightening of screw bolt 8, press against the bolt and bite into the same, thereby acting in the manner of anti-vibration safety tongues. The more the screw is tightened, the greater is the pressure of the hooks against the bolt. This friction is of considerable importance, since it obviates the need for locking washers or other safety devices to prevent involuntary displacement of the screw.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A wall anchor for anchoring in a mounting hole in a support member, said wall anchor comprising a hollow internally threaded shank having a pair of resilient legs extending outwardly from a peripheral edge of said shank at an acute angle with the center axis of the shank, each of said legs having at its tip a first hook substantially within the general plane of the legs and below said first hook a second hook extending transverse to the center axis of the shank and providing a surface facing but spaced apart from the first hook, and a headed screw bolt screwable into said shank.

2. A wall anchor according to claim 1, wherein each of said legs has intermediate its tip and its base at the shank a transverse score line to facilitate bending of the arm at this score line.

3. A wall anchor according to claim 1, wherein each of said legs is formed of a strip of springy metal extending from the respective peripheral sleeve edge, the general plane of the strip facing the center axis of said shank.

4. A wall anchor according to claim 3, wherein each first hook is pointed at its outer end, and wherein each second hook is at substantially a right angle to the general plane of the respective strip.

5. A wall anchor according to claim 1, wherein said legs extend from diametrically opposite peripheral edge points of the shank and are symmetrically disposed to define the outline of an imaginary cone having its apex at said edge of the shank.

References Cited

UNITED STATES PATENTS

| | | | |
|---|---|---|---|
| 1,049,376 | 1/1913 | LeManquais | 85—80 |
| 1,161,155 | 11/1915 | Pleister | 85—85 |
| 2,184,783 | 12/1939 | Tinnerman | 151—41.75 |
| 2,387,468 | 10/1945 | Ritzel | 85—84 |
| 2,850,936 | 9/1958 | Poupitch | 85—71 |

FOREIGN PATENTS

| | | |
|---|---|---|
| 999,794 | 10/1951 | France. |
| 975,434 | 11/1964 | Great Britain. |

EDWARD C. ALLEN, *Primary Examiner.*